Sept. 5, 1967  J. KRAUS  3,339,989

MOUNTING A SELF-CENTERING BEARING

Filed Jan. 21, 1965

INVENTOR.
JOHAN KRAUS
BY
*Frank R. Trifari*
AGENT

3,339,989
MOUNTING A SELF-CENTERING BEARING
Johan Kraus, Eindhoven, Netherlands, assignor to North American Philips Company, Inc., New York, N.Y., a corporation of Delaware
Filed Jan. 21, 1965, Ser. No. 426,937
Claims priority, application Netherlands, Feb. 21, 1964, 64—1,621
3 Claims. (Cl. 308—72)

ABSTRACT OF THE DISCLOSURE

This disclosure relates to a self-centering shaft bearing assembly wherein a substantially spherical bearing is supported in a housing by a thermoplastic bearing support body, the support body being rigidly anchored to a housing. The support body engages the bearing in such a manner as to permit pivotal engagement and also to define a lubricant reservoir between the bearing and the support body.

---

Figure 1:
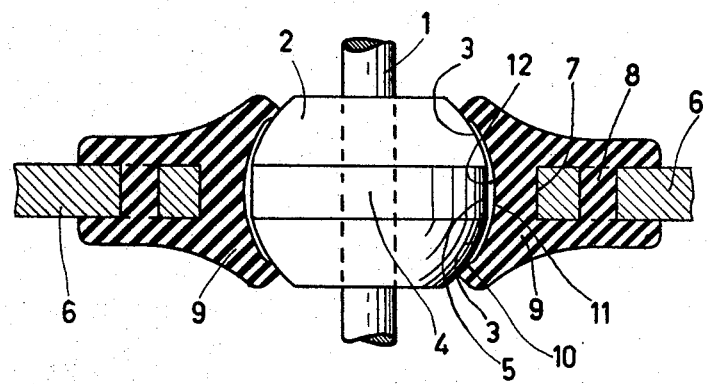

The invention relates to a self-centering shaft bearing, having a mainly spherical surface and a partially cylindrical surface and in which each outer surface has a centre line which coincides with the axis of the bearing. The support for said bearing permits rotation of the bearing about the center of the spherical shape.

Self-centering bearings of this type are manufactured and sold in very great numbers. Usually the globe-like bearing is made of sintered metal, for example, bronze or steel. Such bearings are used mainly for shafts having a small diameter (for example 10 mm. at the most) in small electric motors and the like. The bearing is mounted so that it is capable of rotating about the centre point of its spherical outer surface. This permits alignment of the openings of the bearing at each end of the shaft even though said openings are not precisely in line with each other. Particularly for small electric motors it is very important that no excessive friction should occur between bearing and shaft and by using self-centering bearings friction is minimized. In the known arrangement, such bearings are usually mounted in a semi-spherical dish rigidly secured in the motor housing and the bearing is then enclosed by a second semi-spherical dish, which engages the opposite side of the bearing under adjustable or non-adjustable spring pressure. This construction is expensive, especially in mass production and has to be adjusted manually, so that the assembly becomes still more expensive.

The improvement of this invention relates to an enclosure for such a bearing which is inexpensive, need not be adjusted and has little or no resistance to displacement of the bearing, i.e. is self adjusting. According to the invention, there is provided a fixed, annular body having a bore surrounding the bearing which has a larger spherical diameter than the outer diameter of the bearing. The bearing is supported between the spherical faces of the bore which are substantially equal to the bearing diameter. The annular body consists of a thermoplastic synthetic substance anchored on the bearing housing.

According to a presently preferred embodiment of the invention the annular bearing support body forms part of the housing accommodating the bearing. The anchorage between the housing and the bearing support is formed by a portion of the thermoplastic support body which passes through a plurality of apertures in the housing and interconnects sections of the support body on either side of the housing. This is one of the easiest methods of obtaining a solid anchorage of the bearing support body.

The thermoplastic substance consists of a linear polyamide, preferably a thermally conducting, stabilized nylon, which is resistant to higher pressure and higher temperature than the normal polyamide. In practice, it has been found that a satisfactory connection and a satisfactory thermal conductivity between bearing and housing is obtained.

According to the invention, the thermoplastic substance may be applied by injection molding which can be carried out at very low costs.

The invention will be described more fully with reference to the drawing which shows the presently preferred embodiment of the invention and in which FIG. 1 is a sectional view of a self-centering bearing according to the invention.

Figure 2:
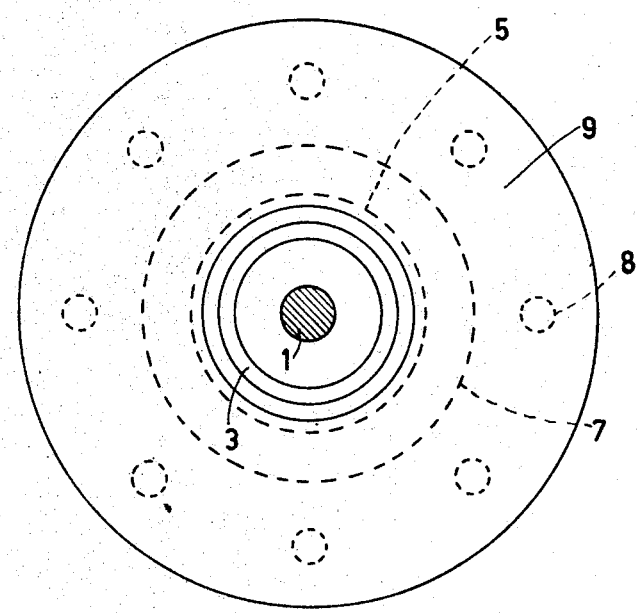

FIG. 2 is a plan view of the structure of FIG. 1.

Reference numeral 1 designates a shaft journalled in a bearing 2. The bearing 2 is made of sintered bronze in known manner and is bounded on the outer side by two faces 3, which form part of a sphere, the centre of which is located at 4. The spherical faces are interconnected by a central cylindrical surface 5. Reference numeral 6 designates part of a motor housing or the like accommodating the bearing 2, provided with a circular aperture 7, the diameter of which exceeds the outer diameter of the cylindrical face 5. The housing 6 is also provided with a plurality of apertures 8.

A bearing support body 9 of thermally conducting, stabilized nylon is injected between the housing part 6 and the bearing 2. The portions of the body 9 on each side of the housing 6 (above and below) are interconnected by the integral connecting pins which fill the apertures 8, so that the bearing support body 9 is rigidly anchored to the housing 6. The bearing 2 is held only by the rims 10 of body 9 which embrace the spherical portion of the bearing. Between the cylindrical face 5 and the opposite inner boundary 11 of the body 9 there is a space 12.

To provide the above described relationships between the support body 9 and the bearings, it is necessary to include a rigid connection between the bearing support body 9 and the housing 6. The molded thermoplastic resin support body shrinks substantially during cooling. If a rigid connection was not provided, the support body 9 would shrink until it would rigidly engage the bearing 2. This engagement would preclude the rotation and the self-centering features of the bearing assembly. The injecting of thermoplastic resin within the aperture 8 in the housing 9 provides a rigid connection between the support body 9 and the housing 6 and thereby prevents the thermoplastic resin body from withdrawing from the housing 6 and rigidly engaging the bearing 2. The gap 12 between the support body 9 and bearing 2 is formed during shrinkage of the body 9. The rim portions 10 of the support body 9 are drawn inwardly during shrinkage and engage the spherical surfaces 3 of the bearing 2. This engagement at 10 between the body 9 and the bearing 2 provides a frictional contact which is sufficient to prevent arbitrary rotation, but not of a magnitude to restrict the self-centering of the bearing.

The provision of the space 12 has a further advantage. Sintered metal bearings are usually employed as self-lubricating bearings, which hold the lubricant owing to their porosity, for example oil. Owing to the production of heat, however, part of the oil is expelled and gets lost. In the structure described, however, the oil is collected in the space 12 and after cooling the oil re-enters the bearing so that no lubricant is lost, while heat is conducted away satisfactorily.

The structure described, which gives satisfactory results in practice, is particularly suitable for use with comparatively thin shafts which are utilized in small electric motors, measuring instruments, fine mechanics and the like. The structure is inexpensive and can be mounted readily and no adjustment is required.

It is, of course, possible to provide the anchorage without the use of apertures. Use may be made for example of upright rims, grooves and the like in the part 6 adjacent aperture 7. The structure illustrated is less expensive, however.

What is claimed is:

1. A self-centering bearing assembly for a shaft comprising a bearing having a central aperture for receiving a shaft, said bearing having a cylindrical surface portion and a generally semi-spherical surface portion at each end of said cylindrical portion, a bearing support, said bearing support comprising a body of thermoplastic material engaging said semi-spherical surface portions and in spaced relation to said cylindrical portion thereby providing a lubricant reservoir, and means for anchoring said bearing support, said means for anchoring said bearing support comprising a housing wall member having an enlarged opening for receiving said bearing, a plurality of apertures in said housing wall member adjacent said opening, and said body overlying each side of said housing wall member and extending through said aperture.

2. A self-centering bearing according to claim 1 wherein said thermoplastic material consists of a thermally conducting linear polyamide.

3. A self-centering bearing assembly for a shaft comprising a bearing having a central aperture for receiving a shaft, said bearing having a cylindrical surface portion and a substantially semi-spherical surface portion at each end of said cylindrical portion; a bearing support body comprising a body of thermoplastic material having a bore therethrough, said bore having rim portions engaging said semi-spherical surface portions of said bearing and having a spherical diametral inner surface in spaced relation to said cylindrical surface portion of said bearing, said spaced relation defining a gap for providing a lubricant reservoir; and means for anchoring said bearing support body comprising a housing wall member having an enlarged opening therethrough and having an additional plurality of apertures in said housing adjacent said opening, said bearing support body being positioned within said opening, with said support body having a plurality of portions passing through said plurality of apertures, said plurality of portions being integral with further portions of said support body positioned on each side of said wall member.

References Cited

UNITED STATES PATENTS

| | | | |
|---|---|---|---|
| 2,097,318 | 10/1937 | Dowell | 287—85 |
| 2,149,983 | 3/1939 | Smith | 308—72 |
| 2,717,792 | 9/1955 | Pelley | 308—72 |
| 2,720,119 | 10/1955 | Sherman | 308—238 X |
| 3,115,375 | 12/1963 | Haller | 308—72 |
| 3,232,681 | 2/1966 | Mittmann et al. | 308—72 X |

MARTIN P. SCHWADRON, *Primary Examiner.*

R. F. HESS, *Assistant Examiner.*